United States Patent [19]
Takami et al.

[11] 3,893,770
[45] July 8, 1975

[54] APPARATUS FOR ANALYSING A PLURALITY OF MIXED GASES

[75] Inventors: Katsumi Takami, Tokyo; Chiaki Shimbo, Hachioji; Kyo Suda, Mitaka, all of Japan

[73] Assignee: Hitachi, Ltd., Japan

[22] Filed: Sept. 4, 1973

[21] Appl. No.: 394,256

[30] Foreign Application Priority Data
Sept. 5, 1972 Japan............................ 47-88826

[52] U.S. Cl. ................ 356/96; 250/339; 250/345; 356/51
[51] Int. Cl. ........................................ G01n 21/34
[58] Field of Search.................... 356/51, 96–98, 356/201, 204–206; 250/343–345, 339

[56] References Cited
UNITED STATES PATENTS
3,748,044   7/1973   Liston.............................. 356/98 X
3,790,797   2/1974   Sternberg et al. .................. 250/345

*Primary Examiner*—Ronald L. Wibert
*Assistant Examiner*—F. L. Evans
*Attorney, Agent, or Firm*—Craig & Antonelli

[57] ABSTRACT

In the analysis of mixed gases, electrical signals corresponding to the absorption spectra of a specific wavelength range corresponding to the component gases whose mutual spectrophotometric interferences are irreversible are corrected by other electrical signals simulating the interferences between the component gases.

2 Claims, 4 Drawing Figures

APPARATUS FOR ANALYSING A PLURALITY OF MIXED GASES

The present invention relates to a multichannel gas analyser which is so designed as to decrease the interferences among the absorption spectra for the component gases of mixed gas.

For easy understanding, the present invention will be described through its application to the measurement of the components of the gas in a flue of heavy oil boiler. Usually, $SO_2$, NO and $NO_2$ exist in the flue. In order to continuously and automatically measure the concentrations of these gases $SO_2$, NO and and $NO_2$ therefore, it is necessary to prepare three analysers adapted respectively for these gases. This may, however, cause an extraordinary expense and a nuisance in maintenance. To eliminate these drawbacks, a method is proposed in which a spectrophotometer is used to detect the absorption spectra for the three kinds of gases while a single measurement device is used to measure the concentrations of the three component gases. In this way, NO and $SO_2$ can be measured by detecting the absorption spectra in the infra-red range and $NO_2$ can be measured by detecting the absorption spectrum in the visible range. In the infra-red range, however, water vapor in the flue adversely affects the measurement. Moreover, in the infra-red range, appreciable absorptions by the gases of organic compounds in the flue takes place so that considerable interferences appear to cause errors in measurement. An absorption bath to absorb only the spectra of the organic compounds may be provided so as to reduce such errors. It sometimes happens, however, that the required spectra of the component gases to be measured are also absorbed through the bath to increase the errors in measurement.

Further, if a single spectrophotometer is used to measure the spectra of a plurality of component gases, the absorption spectra of the respective gases are superposed on each other and interfere with each other, so that greater errors are caused.

The object of the present invention is to eliminate the above drawbacks and according to the present invention, there can be provided an analyser for analysing a composite gas consisting of at least two component gases in which absorption spectra of specific wavelength ranges corresponding to the component gases which make the interferences between the component gases irreversible, are obtained by a dispersive spectrometer, the absorption spectra are converted to electrical signals depending upon their intensities, and the concentrations of the component gases are measured by compensating for the irreversible interferences by means of function generations and arithmetic units each of the numbers of which are equal to that of the irreversible interferences.

Let it be now assumed that X, Y and Z represent three different kinds of component gases constituting a mixed gas. It is then evident that if the interferences between the component gases X, Y and Z are non-linear and reversible, as represented such that X ⇆ Y, Y ⇆ Z and Z ⇆ X, the interferences cannot be easily compensated. Experiments have also revealed that if each interference between the gases is irreversible, as represented such that X → Y, Y → Z and Z → X, but non-linear and circulating (as represented such that X → Y → Z → X → Y ...... ), then the electrical compensation of the interference is not easy.

On the other hand, if, as described later, the types of interferences are such that X → Y, Y → Z and Z → X, the effects of the interferences can be easily compensated by an electrical method. Here, the types of the interferences are defined as "irreversible interferences" and the gas interfering with another is called "an interfering gas" while the gas interfered with by another is represented as "an interfered gas." The types of interferences such that Y → X, X → Z and Y → Z or Z → X, X → Y and Z → Y, are interpretted also as irreversible interferences.

Now, the present invention will be described by way of embodiments with the aid of the attached drawings, in which.

Figure 1:
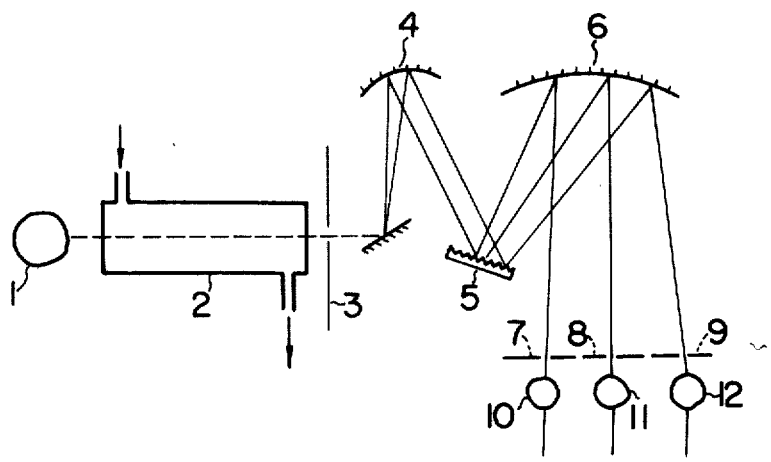
FIG. 1 shows a schematic structure of spectrometer embodying the present invention.

In FIG. 1 is shown a schematic structure of a spectrometer which can exhibit such irreversible interferences between NO, $SO_2$ and $NO_2$ gases as described above. The spectrometer consists of a light source 1 (visible to ultra-violet ranges), a gas cell 2, an incident slit 3, a collimator 4, a diffraction grating 5 (fixed), a reflector 6, exit slits 7, 8 and 9 for the spectra of NO, $SO_2$ and $NO_2$ gases respectively, and photoelectric transducers 10, 11 and 12 (including photomultiplier tubes) for the slits 7, 8 and 9 respectively. Here, the slits 7, 8 and 9 may be replaced by a multi-slit having a plurality of slit openings. If the concentrations of NO, $SO_2$ and $NO_2$ gases are measured by detecting the absorption spectra respectively near the wavelengths of $0.20\mu m$, $0.3\mu m$ and $0.42\mu m$, then the simultaneous measurement of the three component gases is possible by using a single diffraction grating and three exit slits, since in this case the absorption spectra lie within a comparatively narrow band. Moreover, it can be found out that if such spectra as mentioned above is used the effects of interferences are irreversible as shown in TABLE I given below.

TABLE I

| KINDS OF GASES | OUTPUT TERMINAL NO | $SO_2$ | $NO_2$ |
|---|---|---|---|
| NO | (100%) | 0 | 0 |
| $SO_2$ | +100% | (100%) | 0 |
| $NO_2$ | +7% | −1.3% | (100%) |

TABLE I shows each output value of NO, $SO_2$ and $NO_2$ in the case that each of NO, $SO_2$ and $NO_2$ is solely present, in which the zero value means no output and the values encompassed by ( ) designate the output of themselves.

According to this table, for example, in case where $NO_2$ of 100 ppm exists in the gas cell but there is neither $SO_2$ nor NO therein, an electric output can be delivered at the terminal for NO which output is equal to a signal indicating +7 ppm. In like manner, the terminal for $SO_2$ develops an output of −1.3 ppm. It is also seen from the table that the types of interferences are such that $NO_2 \rightarrow SO_2$, $SO_2 \rightarrow NO$, and $NO_2 \rightarrow NO$.

Figure 2:
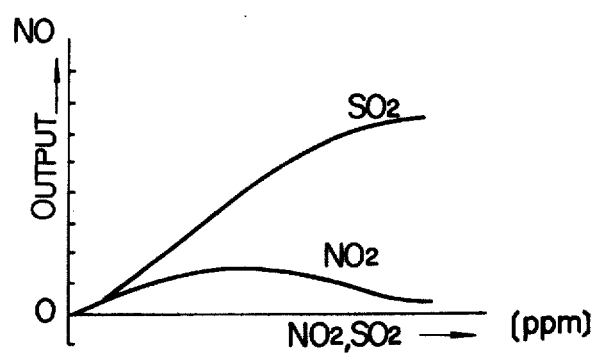
FIG. 2 shows the effects of interference of $NO_2$ and $SO_2$ gases with NO gas.

FIG. 2 shows the interferences of $NO_2$ and $SO_2$ with the channel of NO. Namely, even if there is no NO in the gas cell, the effects of interferences in the positive directions are observed due to $NO_2$ and $SO_2$ interfering with the NO channel. And the output $V_{NO}$ at the terminal for NO varies non-linearly depending upon the concentrations of the other gases.

Figure 3:
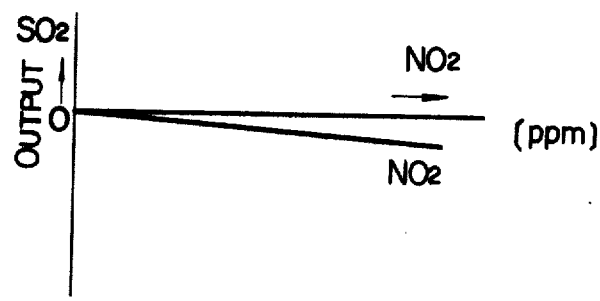
FIG. 3 shows the effect of interference of $NO_2$ gas with $SO_2$ gas.

FIG. 3 shows the interference of $NO_2$ with the channel of $SO_2$. In this case, as described above, there is no interference of NO with the $SO_2$ channel.

Figure 4:
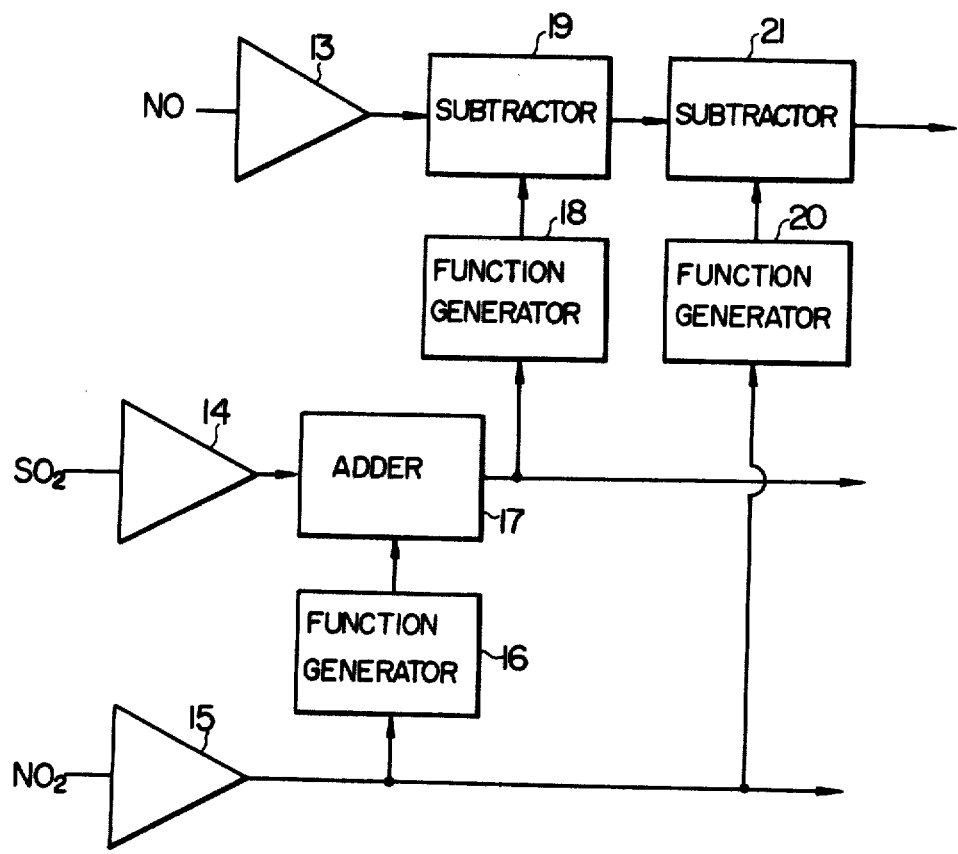
FIG. 4 is a block diagram of an embodiment of the present invention.

In order to compensate for the non-linear interference effects as described above, the present invention provides a circuit which is shown in block diagram in FIG. 4.

In FIG. 4 are shown amplifiers 13, 14 and 15 which receive the outputs of the photoelectric transducers 10, 11 and 12, that is, signals corresponding to NO, $SO_2$ and $NO_2$, respectively; a function generator 16 which electrically simulates the effect of the interference of $NO_2$ with the channel of $SO_2$; an adder 17; a function generator 18 which electrically simulates the effect of the interference of $SO_2$ with the channel of NO; a subtractor 19; a function generator 20 which electrically simulates the effect of the interference of $NO_2$ with the channel of NO; and a subtractor 21. With this circuit configuration, the output at the terminal for $SO_2$ is fed to the channel of NO after the effect of interference due to $NO_2$ has been eliminated, and there the effect of interference due to $SO_2$ to NO is eliminated. The output for NO, after the effect of interference due to $NO_2$ has been eliminated, is delivered as a final output. As to the output for $NO_2$, with no interference effect due to the other compositions $SO_2$ and NO, the output of the amplifier 15 is delivered as a final output. In this case, it should be noted that the application of compensation signals is irreversible and unidirectional, but neither circulating nor reversible.

In the embodiment described above, there is need for as many arithmetic units as the irreversible interferences, but the number of the arithmetic units can be reduced if each of the used units has more than two inputs. For example, in case of compensating the interferences of $NO_2$ and $So_2$ with NO, as in the previous embodiment, it is also possible to send the outputs of the function generators 18 and 20 to a single arithmetic unit to obtain the actual concentration of NO. Here, only two function generators suffice for the purpose.

Moreover, in the above embodiment, the locations of the exit slits for NO, $SO_2$ and $NO_2$ are so selected as to be near the wavelengths of $0.20\mu m$, $0.30\mu m$ and $0.42\mu m$. If, however, the locations and the widths of the slits are slightly changed, the amount of interference can be varied with the interference remaining irreversible. It is needless to say that in this case also, the irreversible interference effect can be compensated by suitably predetermining the function to be generated from the function generating means, in the same manner as in the above case.

As described above, according to the present invention, the effect of interference can be easily eliminated by an electrical circuit since the absorption spectra of specific wavelength ranges in which the interferences are irreversible, are used. Accordingly, there is caused no error which might be produced by a chemical pre-treatment, and the maintenance as well as the continuous and automatic measurement can be facilitated due to the electrical post-treatment. Moreover, the disturbance by water vapor can be eliminated by using the wavelengths of visible to ultra-violet ranges.

The foregoing description has been given to the case of the interferences among the three component gases $So_2$, $NO_2$ and NO, but the present invention is not limited to the described embodiments alone but applicable to other cases if the interference characteristics in those cases can be known.

What we claim is:

1. An apparatus for analyzing a composite gas comprising:

means for obtaining an absorption spectrum of each of $NO_2$ gas, $SO_2$ gas and NO gas, the interferences between each gas being irreversible;

means for converting said each respective absorption spectrum into a first, a second, a third electrical signal in accordance with the intensity of the spectrum thereof;

means for generating a fourth electrical signal for simulating the interference between said $NO_2$ gas and $SO_2$ gas, which has the first electrical signal as an input signal;

a first adder which has the fourth electrical signal and the second electrical signal as an input signal;

means for generating a sixth electrical signal for simulating the interference between said $SO_2$ gas and NO gas, which has a fifth electrical signal derived from said adder as an input signal;

a first subtractor which has the third electrical signal and the sixth signal as an input signal;

means for generating a seventh electrical signal for simulating the interference between said $NO_2$ gas and said NO gas, which has the first electrical signal as an input;

a second substractor which has the seventh electrical signal and a eighth electrical signal derived from the first subtractor as an input signal.

2. An apparatus for analyzing a composite gas comprising:

first means for obtaining an absorption spectrum of each respective component gas in said composite gas containing a plurality of gases by passing a beam of light through said composite gas, the respective interference between the component gases being irreversible;

second means, responsive to said first means, for convering each respective absorption spectrum into a respective signal representative thereof;

third means, responsive to a first of the signals representative of the spectrum of a first of said component gases, for generating a first output signal which simulates the interference between said first gas and a second of said gases;

fourth means, responsive to said second and third means, for combining a second of the signals representative of the spectrum of said second of said component gases, and providing a second output signal representative of said second gas with respect to which the interference between said first and said second of said gases has been eliminated;

fifth means, responsive to the output of said fourth means, for generating a third output signal which simulates the interference between a third component gas and said second component gas;

sixth means, responsive to said second and fifth means, for combining a third of the signals representative of the spectrum of a respective third component gas, and providing a fourth output signal representative of said third gas with respect to which the interference between said second and third gases has been eliminated;

seventh means, responsive to said first of the signals representative of said first of said component gases, for generating a fifth output signal which simulates the interference between said first gas and said third gas; and eighth means, responsive to said sixth and seventh means, for combining said fourth and fifth output signals, and providing a sixth output signal representative of said third gas with respect to which the interference between said first and said third gases has been eliminated.

\* \* \* \* \*